(12) United States Patent
Yamasaki

(10) Patent No.: US 8,489,262 B2
(45) Date of Patent: Jul. 16, 2013

(54) ELECTRIC VEHICLE CONTROLLER

(75) Inventor: Hisanori Yamasaki, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 981 days.

(21) Appl. No.: 12/530,391

(22) PCT Filed: Mar. 8, 2007

(86) PCT No.: PCT/JP2007/054536
§ 371 (c)(1),
(2), (4) Date: Sep. 8, 2009

(87) PCT Pub. No.: WO2008/107992
PCT Pub. Date: Sep. 12, 2008

(65) Prior Publication Data
US 2010/0087971 A1    Apr. 8, 2010

(51) Int. Cl.
*G06F 17/00* (2006.01)

(52) U.S. Cl.
USPC ........................ 701/19; 318/400.02

(58) Field of Classification Search
USPC ............... 318/400.01, 400.02, 400.03, 700
See application file for complete search history.

(56) References Cited

U.S. PATENT DOCUMENTS

| 5,659,235 A * | 8/1997 | Yamada et al. ............... 318/801 |
| 5,798,628 A * | 8/1998 | Fujita et al. ................... 318/805 |
| 5,959,430 A * | 9/1999 | Yuki et al. ..................... 318/805 |
| 6,087,791 A * | 7/2000 | Maruyama .................... 318/140 |
| 6,166,514 A | 12/2000 | Ando et al. |
| 8,258,735 B2 * | 9/2012 | Kitanaka .................... 318/400.3 |
| 2003/0030404 A1 * | 2/2003 | Iwaji et al. .................... 318/700 |
| 2003/0187553 A1 * | 10/2003 | Dillen et al. .................... 701/19 |
| 2004/0012203 A1 * | 1/2004 | Schlangen ..................... 290/31 |
| 2008/0048607 A1 * | 2/2008 | Kono ............................ 318/802 |
| 2008/0218111 A1 * | 9/2008 | Okamura ...................... 318/453 |
| 2009/0009119 A1 * | 1/2009 | Kono et al. ................... 318/430 |
| 2009/0079370 A1 * | 3/2009 | Nakamura et al. ........ 318/400.02 |

(Continued)

FOREIGN PATENT DOCUMENTS

| JP | 7-322700 A | 12/1995 |
| JP | 08-322300 | 12/1996 |

(Continued)

OTHER PUBLICATIONS

International Search Report for PCT/JP2007/054536 completed Apr. 19, 2007.

(Continued)

*Primary Examiner* — Khoi Tran
*Assistant Examiner* — Adam Mott
(74) *Attorney, Agent, or Firm* — Buchanan Ingersoll & Rooney PC

(57) ABSTRACT

An object is to obtain an electric vehicle controller capable of reducing a total sum of losses of an AD motor and losses of a main circuit. In a vector-control-command-value calculating unit, according to a torque command T*, a DC-voltage command value EFCR and a magnetic-flux command value F2R for which a total sum of losses of an AD motor and losses of a second main circuit is minimized is calculated and selected. The vector-control-command-value calculating unit outputs the magnetic-flux command value F2R to a vector control unit, and outputs the DC-voltage command value EFCR to a converter control unit.

9 Claims, 9 Drawing Sheets

U.S. PATENT DOCUMENTS

| | | | |
|---|---|---|---|
| 2009/0256518 A1* | 10/2009 | Kitanaka et al. | 318/802 |
| 2009/0295316 A1* | 12/2009 | Patel et al. | 318/400.02 |
| 2010/0072925 A1* | 3/2010 | Itoh et al. | 318/400.02 |
| 2011/0248663 A1* | 10/2011 | Yamakawa et al. | 318/805 |
| 2012/0185121 A1* | 7/2012 | Umehara et al. | 701/22 |

FOREIGN PATENT DOCUMENTS

| | | | |
|---|---|---|---|
| JP | 10-167594 A | | 6/1998 |
| JP | 11-146501 A | | 5/1999 |
| JP | 11-285299 A | | 10/1999 |
| JP | 2001-211511 | | 8/2001 |
| JP | 2001211511 A | * | 8/2001 |
| JP | 2005-160183 A | | 6/2005 |
| JP | 2005-210772 | | 8/2005 |
| JP | 2005210772 A | * | 8/2005 |
| JP | 2006-121855 A | | 5/2006 |
| JP | 2006-129698 A | | 5/2006 |
| JP | 2006-340448 A | | 12/2006 |

OTHER PUBLICATIONS

Written Opinion for PCT/JP2007/054536 completed Apr. 19, 2007.
Supplementary European Search Report dated Jan. 10, 2011, issued in the corresponding European Application No. 07738027.7-2207.

* cited by examiner (1): VOLTAGE COMMAND VALUE AMPLITUDE |V|
   ($\frac{\sqrt{6}}{\pi} \cdot EFC$ DURING ONE-PULSE MODE)
   ACCORDING TO SYSTEM OF PATENT DOCUMENT 1

(2): VOLTAGE COMMAND VALUE AMPLITUDE |V|2 DURING
   MAXIMUM EFFICIENCY CONDITION OF AC MOTOR

ELECTRIC VEHICLE CONTROLLER

TECHNICAL FIELD

The present invention relates to a power converter for railway vehicles, and, more particularly to an electric vehicle controller including an AC motor.

BACKGROUND ART

As described on pages 99 to 134 in Nonpatent Document 1, for example, conventional electric vehicle controllers generally perform so-called vector control. In the vector control, an AC vector flowing in an AC motor is managed and controlled by dividing the AC vector into a magnetic flux component and a torque component in a rotating coordinate system.

Generally, an induced voltage of an AC motor is proportional to a product of a rotating speed of the AC motor and a magnetic flux thereof. The induced voltage becomes uncontrollable when it exceeds the maximum voltage that the controller can output. To ensure that the induced voltage does not become uncontrollable, it is common to perform a control in AC motors to weaken the magnetic flux than a rated magnetic flux in a high speed area. In electric vehicle controllers, following is control is performed for decreasing a switching loss in a power converter of a control device. That is, a one-pulse mode in which only switching is performed twice in 360 degrees in electrical angle of an AC-voltage command fundamental wave to output a rectangular wave voltage fixed to a maximum voltage that the control device can output is used for a high speed area. As described in Patent Document 1, for example, a secondary-magnetic-flux command value is obtained by an arithmetic operation and the obtained value is used for the control so that magnetic flux control and toque control are stably achieved during the one-pulse mode.

Patent Document 1 specifically describes an operating relationship between a magnetic-flux command value $\Phi 2^*2$ and a voltage $|V|$. That is, in a speed area where a rated magnetic flux can be output, the magnetic flux command value is set to be a magnetic flux command of a constant rated value, so that the voltage $|V|$ rises along with the rotating speed. When the voltage $|V|$ reaches an output-controllable maximum voltage, the one-pulse mode is activated. While the voltage is fixed at the maximum value, the magnetic-flux command value is controlled to be small according to the rotating speed by Equation (6) in Patent Document 1.

Meanwhile, Patent Document 2 describes a method to minimize a total sum of a primary copper loss, a secondary copper loss, and a primary iron loss of an induction motor. In this method, a magnetic-flux command value is calculated relative to a torque command value and the induction motor is controlled based on the calculated magnetic-flux command value.

Patent Document 1: Japanese Patent Application Laid-open No. H11-285299
Patent Document 2: Japanese Patent Application Laid-open No. H7-322700
Nonpatent Literature 1: "Theory and Designing Practice of AC Servo System", written/edited by Hidehiko SUGIMOTO, Sogo Denshi Publishing

DISCLOSURE OF INVENTION

Problem to be Solved by the Invention

However, the conventional electric vehicle controller has the following problem. Reduction of the switching loss of a main circuit is prioritized and the one-pulse mode is used aggressively. Thus, a substantially constant fixed voltage is applied to an AC motor irrespective of an actual load state of the AC motor. As a result, the AC motor is not necessarily driven at its maximum efficiency, thereby reducing the maximum efficiency of the entire electric vehicle controller.

On the other hand, when prioritizing driving in which the loss of the AC motor is minimized, it is necessary to set a pulse mode of a main circuit to a pulse mode other than the one-pulse mode to manipulate a fundamental wave amplitude of the voltage command value. In this case, it is possible to select a three-pulse mode, for example. The problem in this case is that, in the case of the three-pulse mode, switching is performed six times in 360 degrees in electrical angle. Therefore, as compared to the one-pulse mode, the switching loss of the main circuit increases in the three-pulse mode.

When using, as a main circuit, a multilevel inverter having three or more levels of gradation, it is possible to select a non-one-pulse mode using a 3-level inverter, for example. In this case, a pulse width modulation is enabled without changing the switching count of a switching unit configuring the main circuit. However, the dimension, weight, number of components, and cost of the main circuit may be increased, and thus there remains a problem that this method can not be applied to all electric vehicles.

Further, even in a configuration of a conventional electric vehicle controller in which voltage of a DC-power source unit is controlled by a converter control unit and a converter main circuit from an AC-power source unit, the voltage of the DC-power source unit is basically controlled so as to be constant, which, similarly after all, necessitates application of voltage independent of the actual load state of the AC motor to the AC motor. This leads to a problem that an optimally efficient driving is not possible and the efficiency of the entire electric vehicle controller cannot reach maximum.

The present invention has been achieved in view of the above problems, and an object of the invention is to provide an electric vehicle controller having a reduced total loss of the AC motor and the main circuit.

Means for Solving Problem

To solve the above problems and to achieve the above objects, according to an aspect of the present invention, there is provided an electric vehicle controller including an AC motor. The electric vehicle controller includes a main circuit configured to convert a DC power supplied from a DC power source into an AC power and supply the AC power to the AC motor; a vector control unit configured to generate a switching command to instruct a switching operation of the main circuit, thereby performing vector control of the AC motor; a torque-command-value generating unit configured to generate a torque command value that is a command value of a torque that the AC motor is caused to output; and a vector-control-command-value calculating unit. The vector-control-command-value calculating unit configured to calculate, from the torque command value, a first magnetic-flux command value for which a loss of the AC motor is minimized, and a second magnetic-flux command value that is a magnetic-flux command value when the AC motor is controlled in a one-pulse mode, calculate a total sum of losses of the AC motor and losses of the main circuit when the AC motor is controlled by the first magnetic-flux command value and a total sum of losses of the AC motor and losses of the main circuit when the AC motor is controlled by the second magnetic-flux command value, and output a magnetic-flux command value corresponding to a total sum of smaller losses to the vector control unit.

Effect of the Invention

According to the present invention, when a magnetic-flux command value is calculated and selected according to a torque command value, and the selected value is output to the vector control unit, the total sum of a loss of an AC motor and a loss of a main circuit is suppressed, and thus the efficiency of the entire electric vehicle controller can be improved.

BRIEF DESCRIPTION OF DRAWINGS

FIG. 9-1 depicts a voltage waveform in a one-pulse mode.

FIG. 9-2 depicts a voltage waveform in a three-pulse mode.

FIG. 9-3 depicts a voltage waveform when a 3-level inverter is used.

EXPLANATIONS OF LETTERS OR NUMERALS

Figure 1:
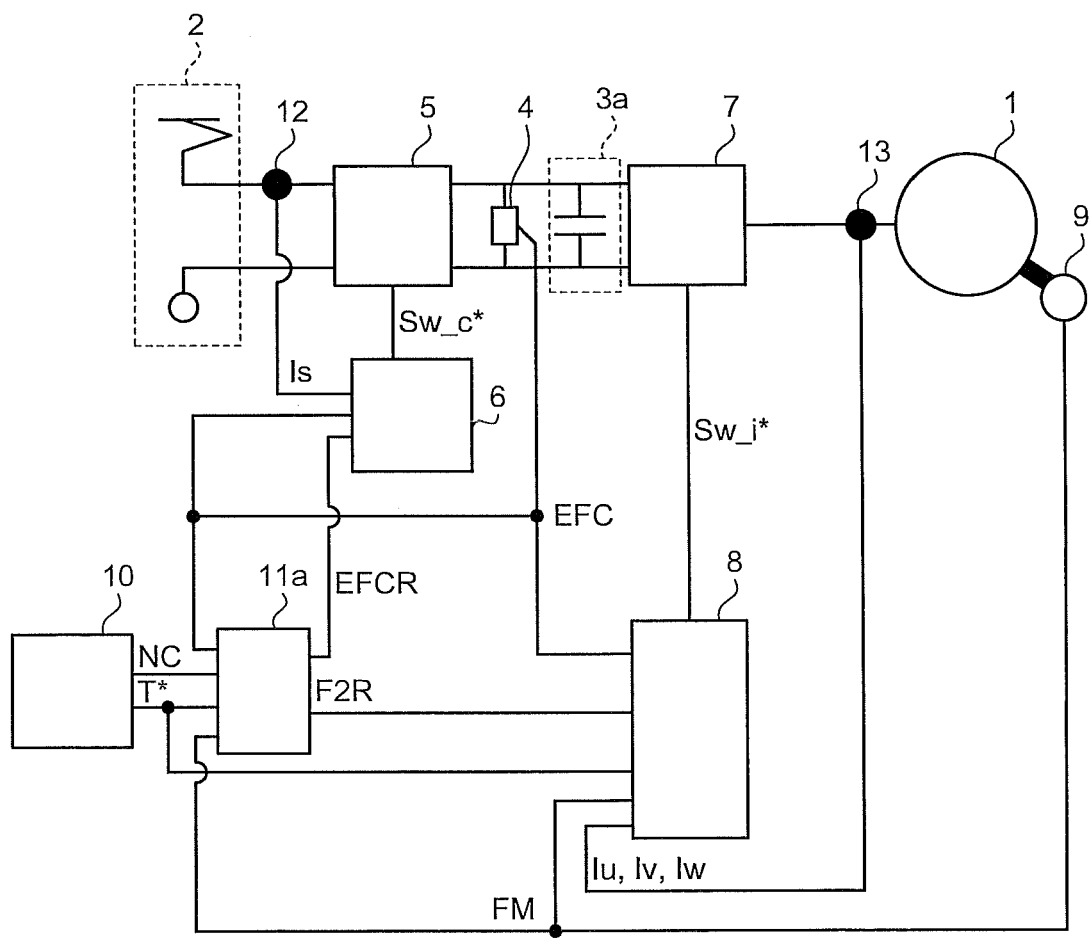
FIG. 1 is a configuration diagram of an electric vehicle controller according to a first embodiment of the present invention.

1 AC motor
2 AC-power source unit
3 DC-power source unit
4 DC-voltage detecting unit
5 first main circuit
6 converter control unit
7 second main circuit
8 vector control unit
9 speed detecting unit
10 torque-command-value generating unit
11 vector-control-command-value calculating unit
12 AC-power-source-state-amount detecting unit

BEST MODE(S) FOR CARRYING OUT THE INVENTION

Exemplary embodiments of an electric vehicle controller according to the present invention will be explained below in detail with reference to the accompanying drawings. The present invention is not limited to the embodiments.

First Embodiment

FIG. 1 is a configuration diagram of an electric vehicle controller according to the present embodiment. As shown in FIG. 1, the present embodiment includes an AC motor 1 that generates torque that powers an electric vehicle and a speed detecting unit 9 that measures a rotating speed of the AC motor 1. The AC motor 1 is an induction motor or a synchronous motor, for example.

Moreover, the present embodiment includes a torque-command-value generating unit 10. The torque-command-value generating unit 10 receives control command information, such as steering wheel maneuver performed by a driver via an operation unit operated by a driver of the electric vehicle, coverts the control command information into a command value T* of torque generated in the AC motor 1 (hereinafter, "torque command value T*"), and outputs the torque command value T*. Furthermore, the present embodiment includes a vector-control-command-value calculating unit 11a that is arranged downstream of the torque-command-value generating unit 10. The vector-control-command-value calculating unit 11a calculates and selects a DC-voltage command value EFCR and a magnetic-flux command value F2R based on input such as the torque command value T* from the torque-command-value generating unit 10, and which outputs the same. Moreover, the present embodiment includes a converter control unit 6 that receives the DC-voltage command value EFCR that is one of the outputs of the vector-control-command-value calculating unit 11a. Furthermore, the present embodiment includes a vector control unit 8 that receives the magnetic-flux command value F2R that is the other output of the vector-control-command-value calculating unit 11a. Note that a value marked with "*" (as in the torque command value T*) represents a command value.

In the present embodiment, an AC power is supplied from an AC-power source unit 2 configured by an overhead contact wire, a pantograph or the like. The present embodiment further includes an AC-power-source-state-amount detecting unit 12 that detects a voltage and a current of the AC-power source unit 2; a first main circuit 5 that converts the AC power output from the AC-power source unit 2 into a DC power under control of the converter control unit 6 and that outputs the DC power; a DC-power source unit 3a that is configured by a condenser or the like, and that has a function of suppressing a pulsation of, and partially storing, the DC power output from the first main circuit 5 and any other similar function; a DC-voltage detecting unit 4 that detects the DC voltage value EFC of the DC-power source unit 3a; a second main circuit 7 that receives the DC power from the DC-power source unit 3a, converts the DC power into an AC power under control of the vector control unit 8, and supplies the resultant power to the AC motor 1; and an AC-motor-current detecting unit 13 that detects an amount of alternating current that is output from the second main circuit 7 and that is supplied to the AC motor 1. An internal configuration of the vector-control-command-value calculating unit 11a is described later.

An operation of the present embodiment is described next. First, a power supplying operation from the AC-power source unit 2 to the DC-power source unit 3a and the AC motor 1 is described. The AC-power source unit 2 supplies an AC power to the first main circuit 5. The first main circuit 5 temporarily converts the AC power into a DC power and supplies the DC power to the second main circuit 7. The DC-power source unit 3a, which is located between the first main circuit 5 and the second main circuit 7, suppresses a pulsation of the DC power and partially stores the DC power, for example. The power conversion control from the AC power to the DC power is controlled by the converter control unit 6. That is, in order that the DC voltage value EFC or the voltage of the DC-power source unit 3a detected by the DC-voltage detecting unit 4 follows the DC-voltage command value EFCR output from the vector-control-command-value calculating unit 11a or a power factor relationship between a current Is and the voltage of the AC-power source unit 2 detected by the AC-power-source-state-amount detecting unit 12 reaches one, a main-circuit switching signal Sw_c* is calculated on a control side, and the main-circuit switching signal Sw_c* is output from the converter control unit 6 to the first main circuit 5. Accordingly, the voltage of the DC-power source unit 3a and the current of the AC-power source unit 2 are controlled, thereby converting the AC power into the DC power.

The DC-power source unit 3a supplies the DC power to the second main circuit 7. The second main circuit 7 converts the DC power into an AC power having a variable voltage and a variable frequency, and supplies the resultant power to the AC motor 1 to drive the AC motor 1. The vector control unit 8, which performs the power conversion control, performs control by outputting the main-circuit switching signal Sw_i* calculated on the control side to the second main circuit 7 so that an actual torque T output by the AC motor 1 follows the torque command value T* input from the torque-command-value generating unit 10, based on a rotation frequency FM of the AC motor 1 detected by the speed detecting unit 9 and 3-phase currents Iu, Iv, and Iw of the AC motor 1 detected by the AC-motor-current detecting unit 13, thereby enabling acceleration and deceleration control of the electric vehicle.

While a flow of the power has been mainly described above, a process content and a control method inside the vector-control-command-value calculating unit 11a and the vector control unit 8 are described below in detail. Particularly, in this specification, it is assumed that an induction motor is used as the AC motor 1. However, the present invention is not limited thereto, and it can be similarly applied to a case where a synchronous motor or the like is used as the AC motor 1.

The vector control unit 8 receives the torque command value T* from the torque-command-value generating unit 10 and the magnetic-flux command value F2R from the vector-control-command-value calculating unit 11a. The vector control unit 8 also receives a rotating angle speed Wm of the AC motor 1 detected in the speed detecting unit 9, and alternating currents Iu, Iv, and Iw detected in the AC-motor-current detecting unit 13.

In so-called vector control, which is normally used in electric vehicles from the late 1990s as a method of torque control of an induction motor, a d-q axis or two-axis orthogonal coordinate system rotating in synchronism with a magnetic flux vector of the induction motor is introduced, and a vector of a current flowing to the induction motor is managed and controlled by dividing it into a magnetic flux component and a torque component. That is, the vector control unit 8 calculates a magnetic-flux equivalent current command I1DR, a torque-equivalent current command I1QR, a slip frequency command Ws of the AC motor 1, and an inverter frequency command Winv.

$$I1DR = F2R/M \tag{1}$$

$$I1QR = L2 \cdot T^*/pm \cdot M \cdot F2R \tag{2}$$

$$Ws = R2/L2 \cdot I1QR/I1DR \tag{3}$$

$$Winv = Wm + Ws \tag{4}$$

Constants in Equations (1) to (4) represents various constants of an induction machine described below, and each value to the induction motor used is set within the vector control unit 8.

R1: primary resistance of the induction motor
R2: secondary resistance of the induction motor
M: mutual inductance of the induction motor
L1: primary self inductance of the induction motor
L2: secondary self inductance of the induction motor
pm: number of pole pairs of the induction motor The alternating currents Iu, Iv, and Iw of the AC motor 1 detected in the AC-motor-current detecting unit 13 are converted into a magnetic-flux-equivalent current I'D and a torque-equivalent current I1Q by Equation (5):

[Equation 1]

$$\begin{pmatrix} I1D \\ I1Q \end{pmatrix} = \sqrt{\frac{2}{3}} \begin{pmatrix} \cos\theta & \cos\left(\theta - \frac{2}{3}\pi\right) & \cos\left(\theta + \frac{2}{3}\pi\right) \\ \sin\theta & \sin\left(\theta - \frac{2}{3}\pi\right) & \sin\left(\theta + \frac{2}{3}\pi\right) \end{pmatrix} \cdot \begin{pmatrix} Iu \\ Iv \\ Iw \end{pmatrix} \tag{5}$$

where θ is a control phase angle, which is to be calculated by Equation (6):

[Equation 2]

$$\theta = \int Winv \cdot dt \tag{6}$$

Next, in order that the magnetic-flux equivalent current command value I1DR and the magnetic-flux equivalent current I1D, calculated by using Equations (1) to (6), are matched, or in order that the torque equivalent current command value I1QR and the torque equivalent current I1Q are matched, the vector control unit 8 generates a voltage command value that should be output by the so-called vector control to the AC motor 1. When the vector control is ideally performed, voltage commands for a d axis and a q axis are as shown with Equations (7) and (8), respectively.

$$Vd^* = R1 \cdot I1DR - \sigma L1 \cdot Winv \cdot I1QR \tag{7}$$

$$Vq^* = R1 \cdot I1QR + Winv \cdot L1/M \cdot F2R \tag{8}$$

where σ=1−M·M/(L1·L2) is a leakage coefficient. Particularly, when the voltage command is converted into an amplitude |V| and a phase angle θv, and when the latter is considered in terms of a relationship with the control phase angle of Equation (6), Equations (9) and (10) can be obtained:

[Equation 3]

$$|V| = \sqrt{Vd^{*2} + Vq^{*2}} \tag{9}$$

$$\theta_V = \theta + \tan^{-1}\left(\frac{Vq^*}{Vd^*}\right) \tag{10}$$

Voltage command values obtained by using Equations (9) and (10) are subjected to pulse-width modulation to calculate the main-circuit switching signal Sw_i*, which is output to the second main circuit 7. When the resultant signal is controlled, it becomes possible to control the torque of the AC motor 1 according to the torque command value T*.

Figures 1, 9:
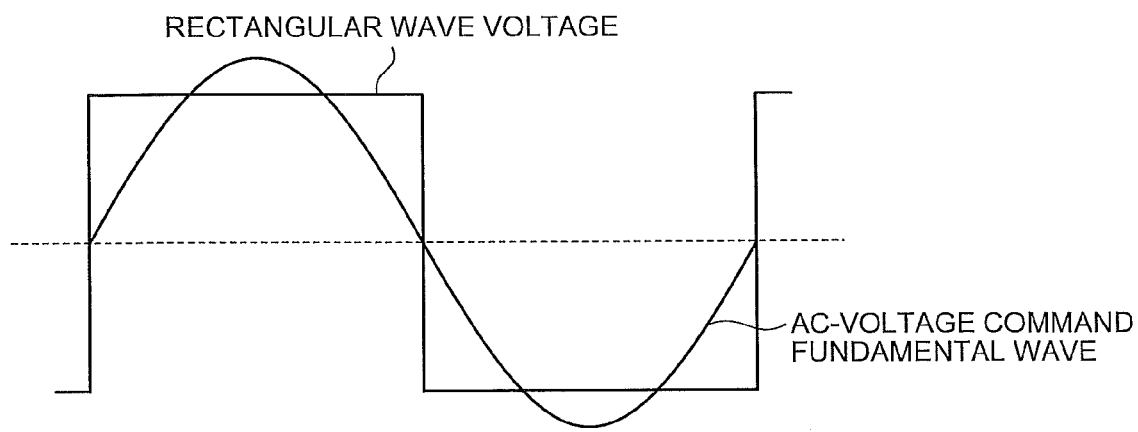
Figures 2, 9:
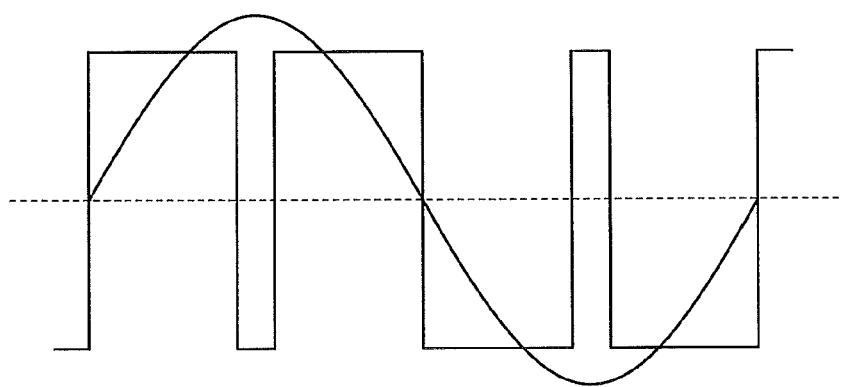
Figures 3, 9:
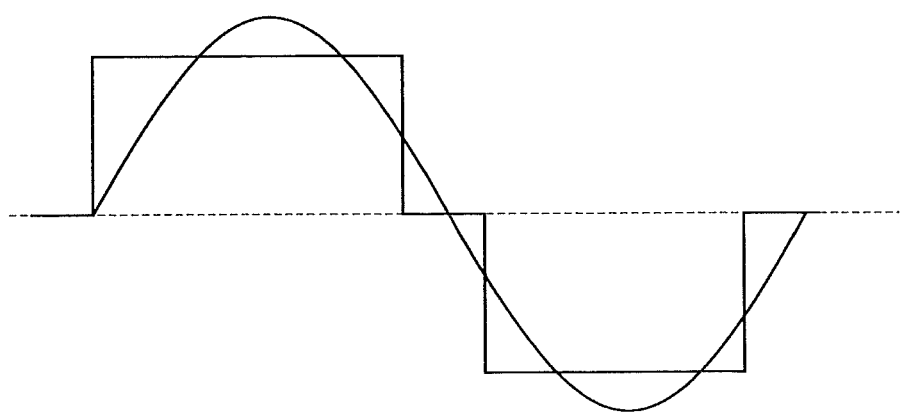

The voltage amplitude |V| in Equation (9) reaches the maximum during the one-pulse mode. A value |V|max at this time is decided by the DC voltage value EFC detected by the DC-voltage detecting unit 4. During the one-pulse mode, as shown in FIG. 9-1, switching is performed only twice in 360 degrees in electrical angle of the AC-voltage command fundamental wave, and the rectangular wave voltage is output.

$$|V|max = \sqrt{6}/\pi \cdot EFC \tag{11}$$

The present embodiment is characterized such that for the purposes of enhancing the efficiency of the entire electric vehicle controller, according to the torque command value T*, the vector-control-command-value calculating unit 11a calculates and selects the (secondary) magnetic-flux command value F2R and outputs it to the vector control unit 8, and also calculates and selects the DC-voltage command value EFCR and outputs it to the converter control unit 6. The detail is described below.

Figure 2:
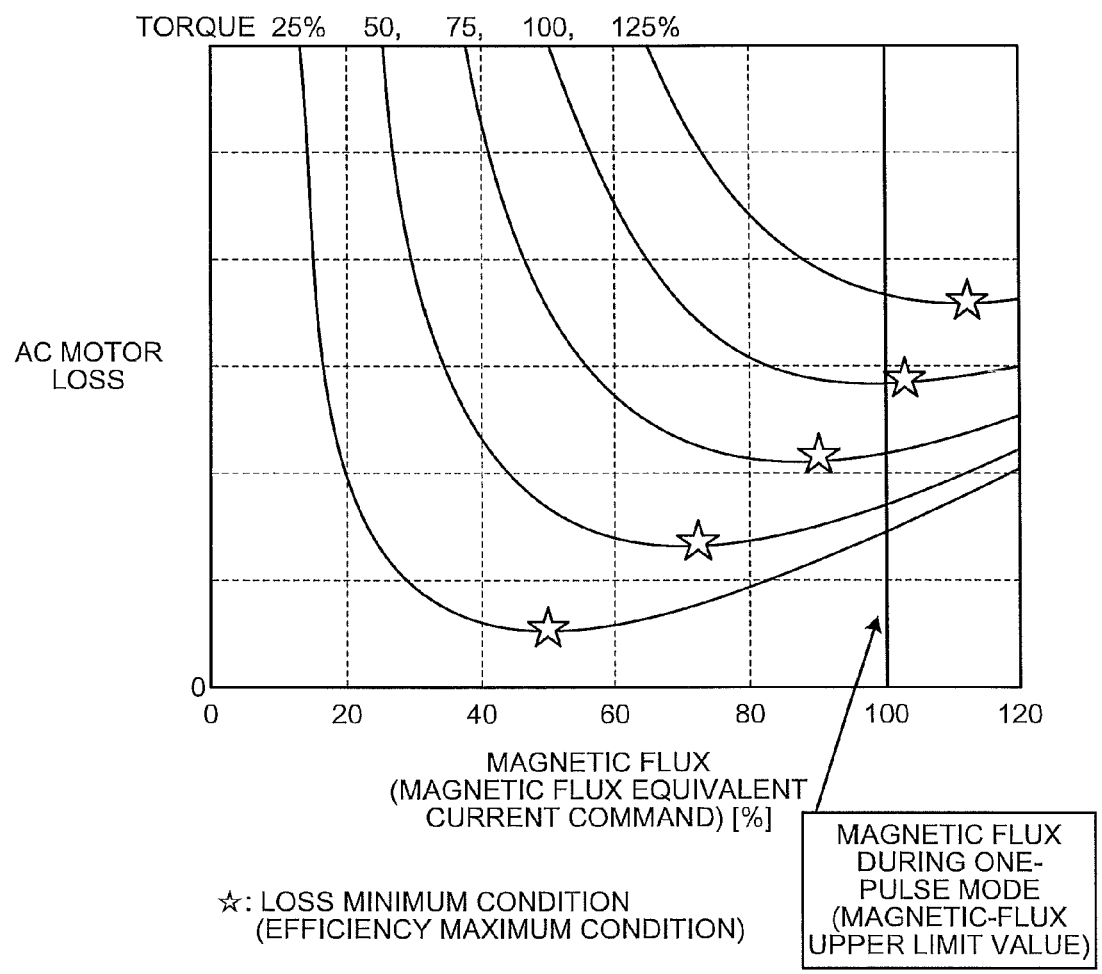
FIG. 2 is a conceptual diagram of loss characteristics of an induction motor.

FIG. 2 is a conceptual diagram of a loss characteristic of the AC motor 1. In FIG. 2, the rotating speed of the AC motor 1 is a constant rated speed, and loss curves when ratings of the torque are 25, 50, 75, 100, and 125[%], respectively, are represented where a horizontal axis is the magnetic flux (magnetic flux equivalent current command) [%] and a vertical axis is loss [W] of the AC motor 1. With respect to the magnetic flux (magnetic flux equivalent current command), a relative amount relative to a magnetic-flux upper limit value is indicated by %, where the magnetic flux (magnetic-flux upper limit value) during the one-pulse mode is 100%. It is shown in FIG. 2 that when the magnetic flux is manipulated, the loss changes and at one point the loss is minimum. That is, when the torque is used as a rating (torque 100%), a magnetic flux with which the loss of the AC motor 1 is minimum is equal to the magnetic-flux upper limit value or magnetic flux during the one-pulse mode, and when the torque is made smaller than the rating (torque less than 100%), a magnetic flux with which the loss of the AC motor 1 is minimum is present in a range smaller than the magnetic-flux upper limit value. When the torque is made smaller, so is the magnetic flux with which the loss of the AC motor 1 is minimum. In FIG. 2, locations at which a loss minimum condition (efficiency maximum condition) is satisfied are assigned with a star on each loss curve. The loss represents a circuit loss of the AC motor 1.

The circuit loss of the AC motor 1 mainly includes a primary copper loss and a secondary copper loss in a circuit resistance on each of a primary side and a secondary side, and an iron loss in an iron core. In terms of physics, there is a following relationship.

The primary copper loss: product of a primary-side current squared and a primary resistance R1 (substantially proportional to a sum of squares of I1D and I1Q)

The secondary copper loss: product of a second-side current squared and a secondary resistance R2 (substantially proportional to I1Q squared)

The iron loss: value in which a primary-side magnetic excitation equivalent current and an iron loss resistance are related (changes depending on I1D)

Accordingly, when the torque command T* is calculated by using Equations (1) and (2) in the vector control, the magnetic-flux command value F2R (or the magnetic flux equivalent current command I1DR) is manipulated, a balance between the magnetic-flux equivalent current I1D and the torque equivalent current I1Q, that is, a circuit loss balance, can be manipulated. When the loss minimum condition in FIG. 2 is stabilized based on the relationship or converted into table data, the magnetic flux equivalent current command I1DR can be calculated and obtained according to the torque command T*.

Figure 3:
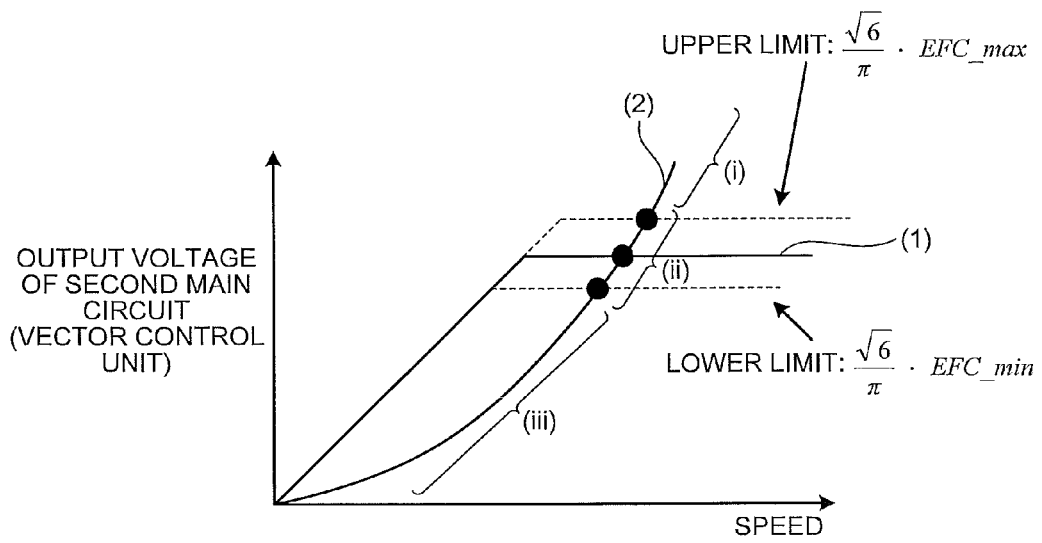
FIG. 3 is a conceptual diagram of speed-dependence characteristics of a terminal voltage of the induction motor.

On the other hand, FIG. 3 is a conceptual diagram of a speed dependence characteristic of a terminal voltage of the AC motor 1. A horizontal axis is a (rotating) speed and a vertical axis is an output voltage of the second main circuit (or the vector control unit). In FIG. 3, (1) represents a voltage characteristic according to the method described in Patent Document 1 and (2) represents a voltage characteristic when the speed is changed under the loss minimum condition (efficiency maximum condition), used in the first embodiment, shown in FIG. 2. The same torque condition applies to both (1) and (2). In FIG. 3, the voltage command value amplitude |V| according to the technique described in Patent Document 1 is in the one-pulse mode in the high speed area, and is fixed to a value dependent on the DC voltage value EFC, that is, $\sqrt{6} \cdot EFC/\pi$ or conversion value thereof (region parallel to the horizontal axis of (1)). To control the voltage amplitude of the AC motor 1 in this region, methods (A) and (B) described below are available. There are restraints to each of the methods.

Method (A): By control through the converter control unit 6, the DC voltage value EFC is increased or decreased.

Method (B): During a switching mode selection of the vector control unit 8, any mode other than the one-pulse mode is selected.

In the method (A), a manipulation range of the DC voltage value EFC is restraint to a range of an upper limit value EFC_max decided from an insulation or withstand voltage property of the first main circuit 5 and a lower limit value EFC_min decided by a voltage condition of the AC-power source unit 2 (AC-voltage-amplitude) and a circuit configuration of the first main circuit 5.

In the method (B), the control range of the voltage command value amplitude |V| of the AC motor 1 is restraint only to a direction equal to or less than $\sqrt{6}/\pi \cdot EFC$. Besides, there is the following demerit. In a case of a generally configured 2-level inverter in the second main circuit 7 used in the electric vehicle, as shown in FIGS. 9-1 and 9-2, when the switching count reaches an operation other than the one-pulse mode which is minimum, the switching count is inevitably increased, and this leads to an increase of the loss of the second main circuit 7. In this case, FIG. 9-2 depicts a three-pulse mode, in which the switching count is six in 360 degrees in electrical angle.

Figure 4:
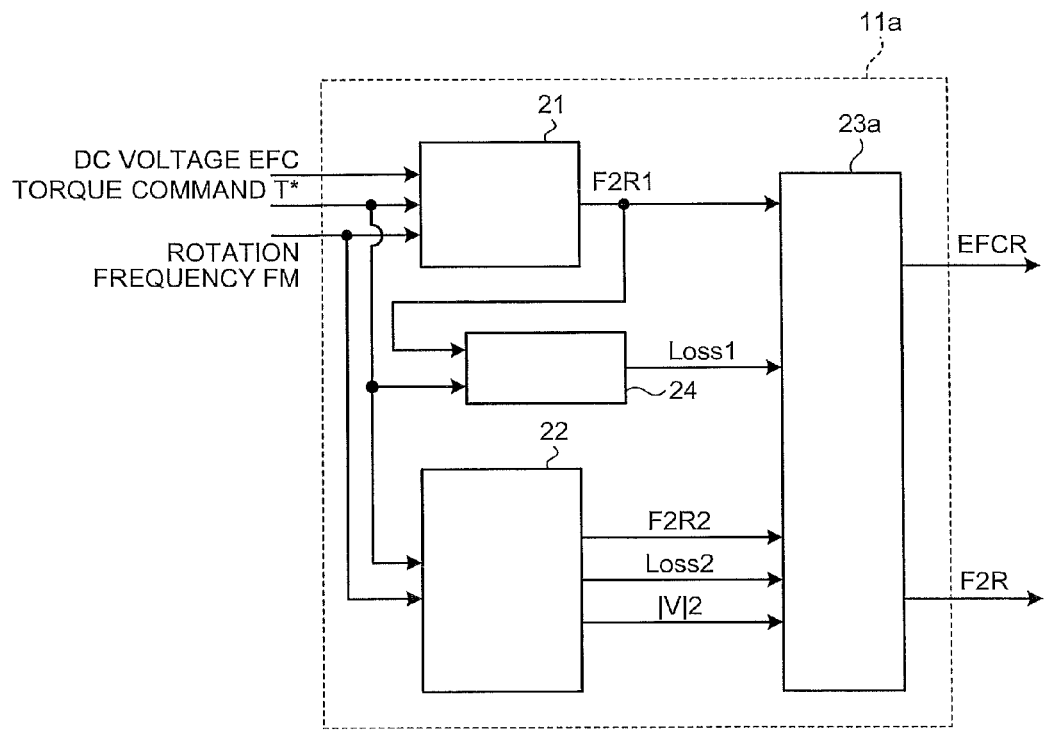
FIG. 4 is a configuration diagram of an internal configuration of a vector-control-command-value calculating unit according to the first embodiment.

Based on the above descriptions, in the present embodiment, the vector-control-command-value calculating unit 11a is configured as in FIG. 4 to realize functions described below. As shown in FIG. 4, the vector-control-command-value calculating unit 11a includes a magnetic-flux-command calculating unit 21, a maximum-efficiency characteristic-function unit 22, a command-value selecting unit 23a, and an F2R1-condition-loss estimating unit 24. The magnetic-flux-command calculating unit 21 calculates all the time a magnetic-flux command value F2R1 for the conventional one-pulse mode, according to the input to the vector-control-command-value calculating unit 11a, that is, the DC voltage value EFC, the torque command T*, and the rotation frequency FM. The magnetic-flux-command calculating unit 21 is realized by a secondary magnetic-flux-command calculating unit described in Patent Document 1, for example. The F2R1-condition-loss estimating unit 24 calculates a loss Loss1 of the AC motor 1 when driven in the one-pulse mode from a relationship of characteristics shown in FIG. 2, based on the torque command T* and the magnetic-flux command value F2R1 for a one-pulse mode output by the magnetic-flux-command calculating unit 21. The maximum-efficiency characteristic-function unit 22 receives the torque command T* and the rotation frequency FM. The maximum-efficiency characteristic-function unit 22 outputs, according to the torque command T*, the magnetic-flux command value F2R2 that maximizes the efficiency of the AC motor 1 from the characteristics shown in FIG. 2. At the same time, a loss Loss2 of the AC motor 1 during the efficiency maximum condition is output from the characteristics in FIG. 2, and further, from Equations (12) to (15), a terminal-voltage amplitude |V|2 of the AC motor 1 during the efficiency maximum condition is calculated:

[Equation 4]

$$Winv2 = Wm + \frac{R2 \cdot T^*}{pm \cdot F2R2^2} \quad (12)$$

$$Vd2^* = R1 \cdot \frac{F2R2}{M} - \sigma L1 \cdot Winv2 \cdot \frac{L2 \cdot T^*}{pm \cdot M \cdot F2R2} \quad (13)$$

$$Vq2^* = R1 \cdot \frac{L2 \cdot T^*}{pm \cdot M \cdot F2R2} + Winv2 \cdot \frac{L1}{M} \cdot F2R2 \quad (14)$$

$$|V|2 = \sqrt{Vd2^{*2} + Vq2^{*2}} \quad (15)$$

In these equations, Winv2, Vd2*, and Vq2* are equivalent to Equations (4), (7), and (8), respectively, and calculated relative to the magnetic-flux command value F2R2.

Two types of magnetic-flux command values F2R1 and F2R2, the losses Loss1 and Loss2 of the AC motor 1 under the corresponding condition, and the terminal-voltage amplitude |V|2 of the AC motor 1 during the efficiency maximum condition are input to the command-value selecting unit 23a. Based on these input values, the command-value selecting unit 23a decides the magnetic-flux command value F2R output to the vector control unit 8 and the DC-voltage command value EFCR output to the converter control unit 6 according to the conditions of the terminal-voltage amplitude |V|2 as described below. Regions corresponding to Conditions (i), (ii), and (iii) are also described in FIG. 3.

(i) Region where $\sqrt{6}/\pi \cdot EFC\_max < |V|2$ is Established

In this region, the terminal-voltage amplitude |V|2 that provides the efficiency maximum condition of the AC motor 1 exceeds an upper limit of voltage that the second main circuit 7 can output, and thus the efficiency maximum condition cannot be selected. However, in order that the loss is minimized within a selectable range according to the characteristics in FIG. 2, EFCR=EFC_max and F2R=F2R1 are selected.

(ii) Region where $\sqrt{6}/\pi \cdot EFC\_min \leq |V|2 \leq \sqrt{6}/\pi \cdot EFC\_max$ is Established In this region, the efficiency maximum condition of the AC motor 1 requires the second main circuit 7 to drive in a one-pulse mode, and this can be achieved by controlling the DC voltage value EFC. Thus, EFCR=$\pi/\sqrt{6}\cdot$|V|2 and F2R=F2R2 are selected. In this case, F2R=F2R1=F2R2 is established.

(iii) Region where $|V|2 < \sqrt{6}/\pi \cdot EFC\_min$ is Established

In this region, the efficiency maximum condition of the AC motor 1 is any mode other than the one-pulse mode. Accordingly, while the loss increase of the second main circuit 7 is taken into consideration, a command value is selected. When the switching loss of the second main circuit 7 during the one-pulse mode is LossP1 and the switching loss of the second main circuit 7 during a non-one-pulse mode is LossPn1, a total of the loss of the AC motor 1 and the loss of the second main circuit 7 is as follows.

When driven in a one-pulse mode according to Patent Document 1: Loss1+LossP1

When driven at a loss minimum point of the induction motor: Loss2+LossPn1

In this case, to reduce the loss of the entire electric vehicle controller, data of LossP1 and LossPn1 are previously provided to the command-value selecting unit 23a. In this state, selected are as follows:

when (iii-a): Loss1+LossP1>Loss2+LossPn1, EFCR=EFC_min and F2R=F2R2, and when (iii-b): Loss1+LossP1≦Loss2+LossPn1, EFCR=EFC_min and F2R=F2R1.

When using a multilevel inverter having three or more levels of gradation (for example, a 3-level inverter. FIG. 9-3 depicts a voltage waveform when the 3-level inverter is used) as the second main circuit 7, the pulse width modulation is enabled without particularly changing the switching count of the switching unit configuring the main circuit. In this case, LossP1=LossPn1, and thus (iii-a) is established all the time in the region (iii). As a result, the F2R2 for the maximum efficiency control can be selected as the magnetic flux command F2R.

As described above, in the command-value selecting unit 23a, the vector-control-command-value calculating unit 11a that determines as follows: (i), (ii), (iii-a), and (iii-b) is configured, and the DC-voltage command value EFCR and the magnetic-flux command value F2R are calculated and selected. Thus, the loss of the entire electric vehicle controller can be reduced.

As described above, according to the first embodiment shown in FIGS. 1 to 4, it is possible to obtain an effect that when the magnetic-flux command value F2R to the vector control unit 8 is selected and manipulated based on the torque command T*, a total sum of the losses of the AC motor 1 and the second main circuit 7 is minimized according to the driving condition and the efficiency of the entire electric vehicle controller can be improved.

Further, in addition to the effect that when the DC-voltage command value EFCR to the converter control unit 6 is selected based on the torque command T*, the loss of the AC motor 1 can be minimized, an effect that the switching loss of the second main circuit 7 is reduced can also be obtained, thereby obtaining an effect that the efficiency of the entire electric vehicle controller can be further improved.

Figure 5:
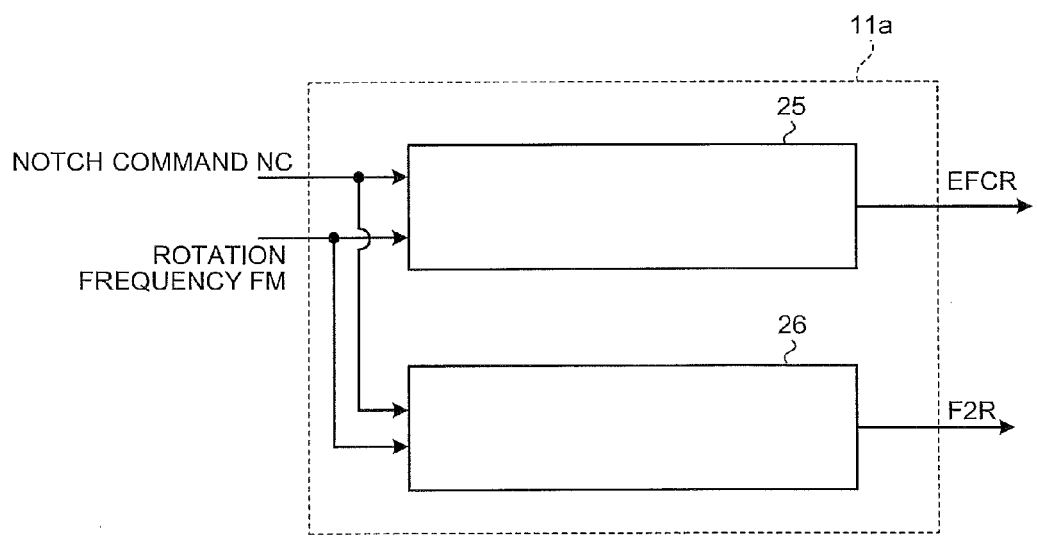
FIG. 5 is a configuration diagram of a vector-control-command-value calculating unit that outputs a command value by using a notch command NC.

In the present embodiment, as shown in FIG. 4, the mode in which the maximum efficiency condition of the AC motor 1 is mounted as a function has been described. However, in some railway vehicles, there is a case that a speed characteristic is previously decided in the torque command T* from the operation unit for each steering wheel input stage (so-called notch command NC), and thus the speed characteristic of the maximum efficiency condition of the AC motor 1 can be previously calculated for each notch command NC. Accordingly, as shown in FIG. 1, in the present embodiment, the torque-command-value generating unit 10 is configured to generate, along with the torque command T*, the notch command NC received from the operation unit. As a result, as shown in FIG. 5, by providing a maximum-efficiency magnetic-flux characteristic table 25 on which the maximum-efficiency magnetic-flux command value F2R2 is previously registered for each notch and a maximum-efficiency-DC-voltage characteristic table 26 on which the maximum-efficiency DC-voltage command value EFC2 is registered for each notch, the vector-control-command-value calculating unit 11a can be made to output and select the DC-voltage command value EFCR and the magnetic-flux command value F2R according to the notch command NC.

By virtue of such a configuration, based on the notch command NC received from the operation unit, the magnetic-flux command value F2R that maximizes the efficiency of the entire controller is selected, and output to the vector control unit 8, thereby providing an effect that the efficiency of the controller can be improved with a simpler configuration. Moreover, based on the notch command NC received from the operation unit, the DC-voltage command value EFCR that maximizes the efficiency of the entire controller can be selected and output to the converter control unit 6, thereby providing an effect that the efficiency of the controller can be improved with a simpler configuration.

Second Embodiment

Figure 6:
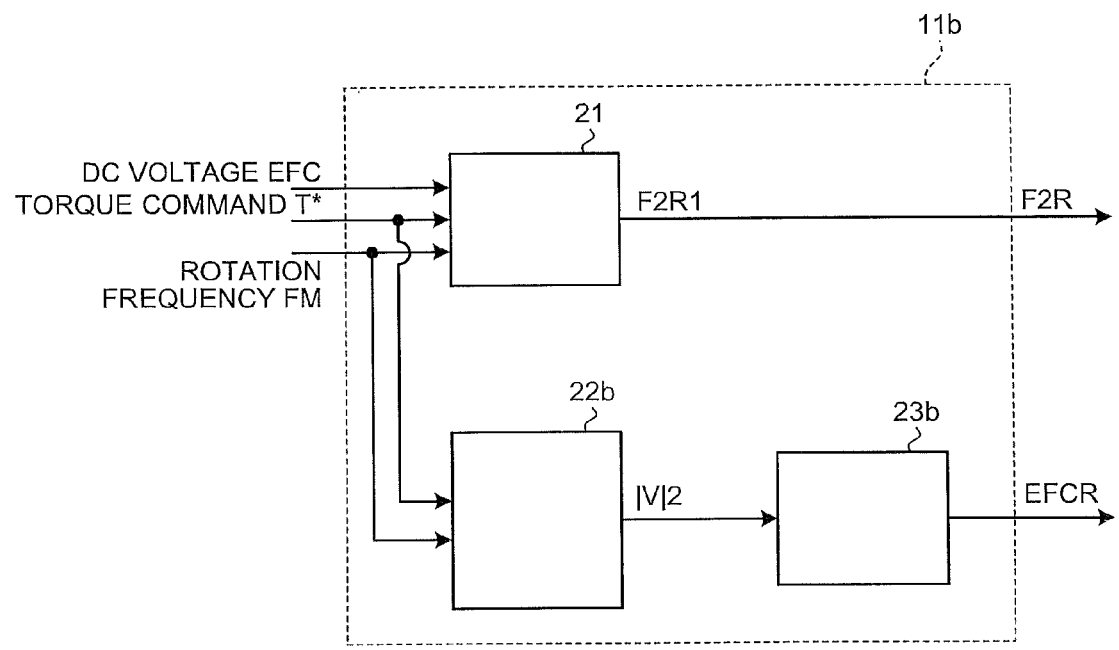
FIG. 6 is a configuration diagram of an internal configuration of a vector-control-command-value calculating unit according to a second embodiment of the present invention.

FIG. 6 is a configuration diagram of an internal configuration of a vector-control-command-value calculating unit according to a second embodiment of the electric vehicle controller of the present invention. In the present embodiment, the vector-control-command-value calculating unit 11*a* according to the first embodiment is replaced by a vector-control-command-value calculating unit 11*b* shown in FIG. 6. According to an operation range of the torque command in the electric vehicle controller, the optimal design for the motor, a specification of an operation range of the DC-power source unit 3*a*, a rail track along which, a condition under which, the electric vehicle actually travels or the like, the proportion of (i), (ii), and (iii) in FIG. 3 is changed. Particularly, in a case of an electric vehicle designed such that the region (iii) is smaller than any other region, and thus it is determined that there is a small contribution to a highly efficient driving, the determination of (iii-a) and (iii-b) in which the loss of the second main circuit 7 is taken into consideration in the configuration of the vector-control-command-value calculating unit 11*a* is omitted, and the high efficiency of the device can be implemented only by the manipulation of the DC voltage value EFC while the one-pulse mode operation is prioritized as described below.

Region (i): EFCR=EFC_max and F2R=F2R1
Region (ii): EFCR=$\pi/\sqrt{6}\cdot|V|2$ and F2R=F2R2 (=F2R1)
Region (iii): EFCR=EFC_min and F2R=F2R1

FIG. 6 depicts the configuration of the vector-control-command-value calculating unit 11*b* that performs such a determination. The vector-control-command-value calculating unit 11*b* includes the magnetic-flux-command calculating unit 21, a maximum-efficiency characteristic-function unit 22*b*, and a command-value selecting unit 23*b*. The magnetic-flux-command calculating unit 21, similarly to the first embodiment, receives the DC voltage value EFC, the torque command T*, and the rotation frequency FM, and calculates all the time the magnetic-flux command value F2R1 for the conventional one-pulse mode. The magnetic-flux command value F2R1 is output, as the magnetic-flux command value F2R, all the time to the vector control unit 8. The maximum-efficiency characteristic-function unit 22*b* receives the torque command T* and the rotation frequency FM to calculate the terminal voltage amplitude |V|2 of the AC motor 1 under the efficiency maximum condition, and outputs the same to the command-value selecting unit 23*b*. The command-value selecting unit 23*b* selects the DC-voltage command value EFCR depending on the regions (i), (ii), and (iii), and outputs the same to the converter control unit 6. In the present embodiment, the one-pulse mode is prioritized all the time, and thus, in the region (iii), the loss minimization of the entire device cannot be strictly achieved. However, a process for selecting the magnetic-flux command value F2R while comparing the loss values becomes unnecessary and an amount of arithmetic operation of a microcomputer is reduced. Accordingly, the mounting of the vector-control-command-value calculating unit 11*b* in practice can be performed more simply. Remaining configuration of the present embodiment is identical to that in the first embodiment.

As described above, by the electric vehicle controller according to the second embodiment shown in FIGS. 1 and 6, when the DC-voltage command value EFCR to the DC-power source unit 3*a* is manipulated based on the torque command T*, a value of the magnetic flux command F2R to the vector control unit 8 is indirectly manipulated, and according to the driving condition, a total sum of losses of the AC motor 1 and the second main circuit 7 is minimized, thereby providing an effect that the efficiency of the entire electric vehicle controller can be improved.

Third Embodiment

Figure 7:
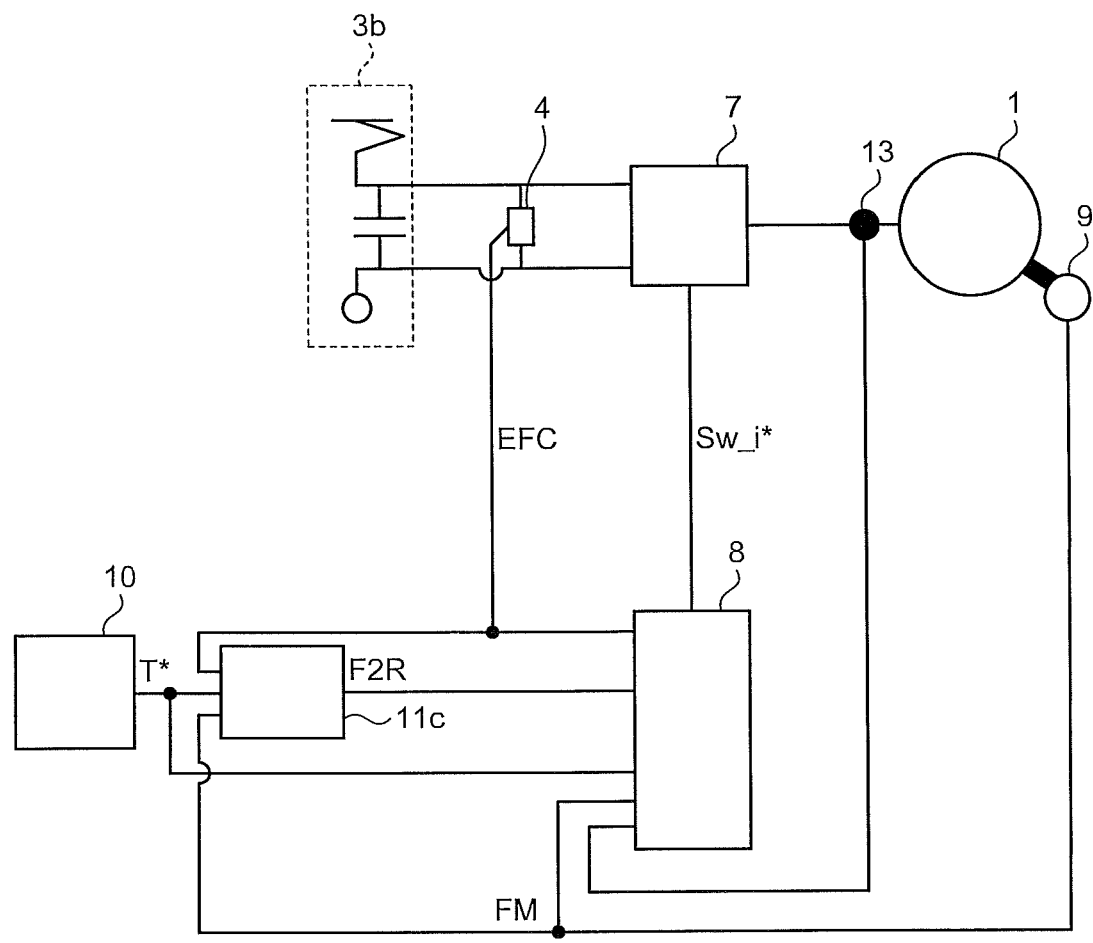
FIG. 7 is a configuration diagram of an electric vehicle controller according to a third embodiment of the present invention.
Figure 8:
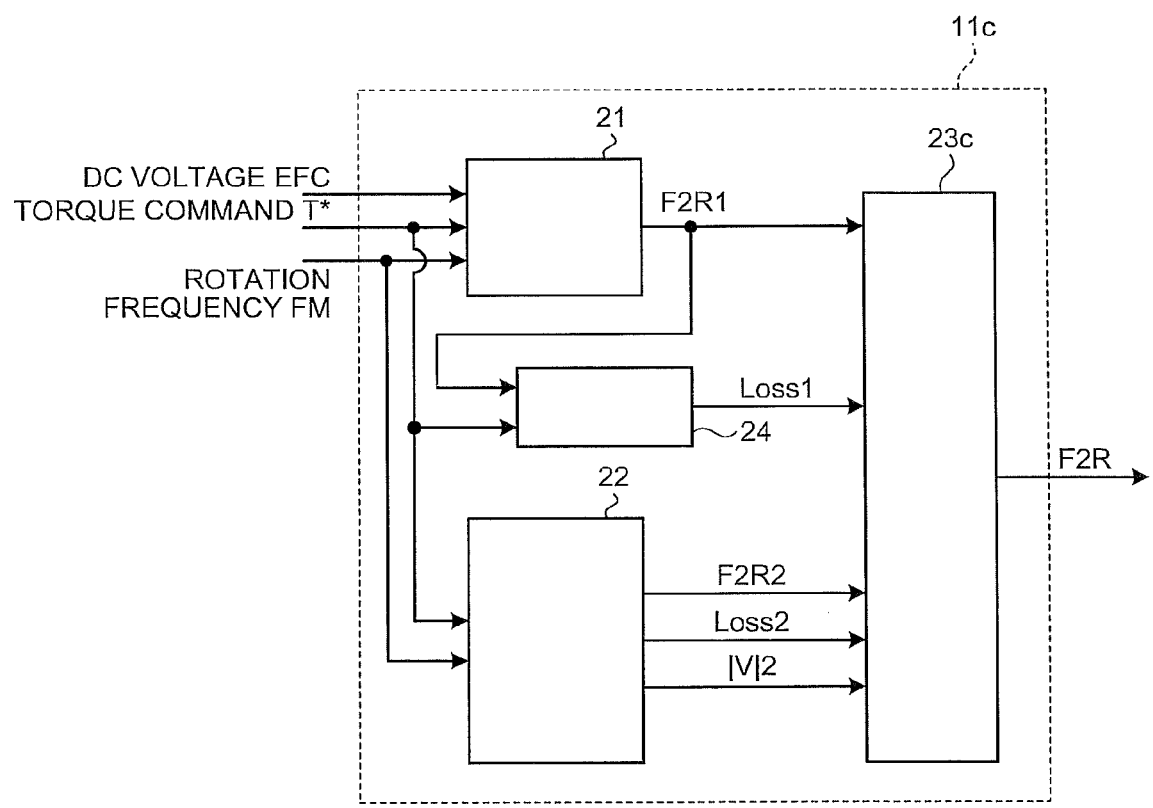
FIG. 8 is a configuration diagram of an internal configuration of a vector-control-command-value calculating unit according to the third embodiment.

FIG. 7 is a configuration diagram of an electric vehicle controller according to a third embodiment of the present invention. FIG. 8 is a configuration diagram of an internal configuration of a vector-control-command-value calculating unit according to the third embodiment. While the first embodiment describes the configuration of a so-called AC electric vehicle in which power is supplied from an AC overhead contact wire, the third embodiment describes a configuration of a so-called DC electric vehicle in which power is supplied from a DC overhead contact wire. That is, as shown in FIG. 7, the power is supplied from a DC-power source unit 3*b* configured by an overhead contact wire, a pantograph, a filter condenser or the like, through the second main circuit 7 controlled by the vector control unit 8 to the AC motor 1. The AC motor 1 generates the torque, which powers the electric vehicle. The relationship between which the torque-command-value generating unit 10 outputs the torque command T*, and the toque control of the AC motor 1 is achieved by the vector control through arrangement of a vector-control-command-value calculating unit 11*c*, the vector control unit 8, the DC-voltage detecting unit 4, the second main circuit 7, the AC-motor-current detecting unit 13, and the speed detecting unit 9 is similar to that in the first embodiment. Therefore, like reference numerals are denoted to like constituent elements and explanations thereof will be omitted. Moreover, a feature that, based on the notch input signal, the configuration in which the vector control of the AC motor 1 is performed is enabled is identical to that in the first embodiment.

Unlike the first embodiment, the present embodiment is a mode in which the DC-power source unit 3*b* is directly supplied with the power by an overhead contact wire and control means of the DC-power source unit is not present. Thus, the vector-control-command-value calculating unit 11*c* does not include means for outputting the DC-voltage command value EFCR, and thus a configuration as shown in FIG. 8 is arranged. The selecting process of the magnetic-flux command value F2R is implemented only in the following (iii-a)' and (iii-b)'.

When (iii-a)': Loss1+LossP1>Loss2+LossPn1, F2R=F2R2
When (iii-b)': Loss1+LossP1≦Loss2+LossPn1, F2R=F2R1

Similarly to the first embodiment, LossP1 is a switching loss during a one-pulse mode, and LossPn1 is a switching loss during a non-one-pulse mode.

Accordingly, by selecting and manipulating the magnetic-flux command value F2R to the vector control unit 8 based on the torque command T* by the electric vehicle controller according to the third embodiment shown in FIGS. 7 and 8, a total sum of the losses of the AC motor 1 and the second main circuit 7 is minimized depending on the driving condition, and thus the efficiency of the entire the electric vehicle controller can be improved.

INDUSTRIAL APPLICABILITY

As described above, the electric vehicle controller according to the present invention is useful for efficiently controlling an AC motor that generates torque for driving an electric vehicle.

The invention claimed is:

1. An electric vehicle controller including an AC motor, the electric vehicle controller comprising:
a main circuit configured to convert a DC power supplied from a DC power source into an AC power and supply the AC power to the AC motor;
a vector control unit configured to generate a switching command to instruct a switching operation of the main circuit, thereby performing vector control of the AC motor;
a torque-command-value generating unit configured to generate a torque command value that is a command value of a torque that the AC motor is caused to output; and
a vector-control-command-value calculating unit configured to
calculate, from the torque command value, a first magnetic-flux command value for which a loss of the AC motor is minimized, and a second magnetic-flux command value that is a magnetic-flux command value when the AC motor is controlled in a one-pulse mode,
calculate a first total sum of losses of the AC motor and losses of the main circuit when the AC motor is controlled by the first magnetic-flux command value and a second total sum of losses of the AC motor and losses of the main circuit when the AC motor is controlled by the second magnetic-flux command value, and
output, to the vector control unit, a magnetic-flux command value corresponding to the smaller of the first and second total sum of losses.

2. An electric vehicle controller including an AC motor, the electric vehicle controller comprising:
a first main circuit configured to convert an AC power supplied from an AC power source into a DC power;
a converter control unit configured to generate a switching command to instruct a switching operation of the first main circuit;
a DC-power source unit configured to receive the DC power from the first main circuit;
a DC-voltage detecting unit configured to detect a voltage of the DC-power source unit;
a second main circuit configured to convert a DC power output from the DC-power source unit into a converted AC power and supply the converted AC power to the AC motor;
a vector control unit configured to generate a switching command to instruct a switching operation of the second main circuit, thereby performing vector control of the AC motor;
a torque-command-value generating unit configured to generate a torque command value that is a command value of a torque that the AC motor is caused to output; and
a vector-control-command-value calculating unit configured to
calculate, from the torque command value, a terminal-voltage amplitude of the AC motor when the AC motor is controlled by a magnetic-flux command value for which a loss of the AC motor is minimized,
select, based on calculated terminal-voltage amplitude and an upper limit value and a lower limit value that are previously decided by a characteristic of the first main circuit and that are related to an applied voltage of the DC-power source unit, a DC-voltage command value to command the voltage of the DC-power source unit, out of a DC-power-source-unit conversion value of the terminal-voltage amplitude, the upper limit value, and the lower limit value, and
output the selected DC-voltage command value to the converter control unit.

3. The electric vehicle controller according to claim 2, wherein the vector-control-command-value calculating unit further calculates the magnetic-flux command value when the AC motor is controlled in a one-pulse mode and outputs the calculated magnetic-flux command value to the vector control unit.

4. The electric vehicle controller according to claim 2, wherein characteristics of the first main circuit include a voltage condition of the AC power source and a circuit configuration of the first main circuit, and an insulating property and a withstand voltage property of the first main circuit.

5. An electric vehicle controller including an AC motor, the electric vehicle controller comprising:
a first main circuit configured to convert an AC power supplied from an AC power source into a DC power;
a converter control unit configured to generate a switching command to instruct a switching operation of the first main circuit;
a DC-power source unit to which a DC power output from the first main circuit is inputted;
a DC-voltage detecting unit that detects a voltage of the DC-power source unit;
a second main circuit that converts the DC power output from the DC-power source unit into a converted AC power and supplies the converted AC power to the AC motor;
a vector control unit that generates a switching command to instruct a switching operation of the second main circuit, thereby performing vector control of the AC motor;
a torque-command-value generating unit that generates a torque command value that is a command value of a torque that the AC motor is caused to output; and
a vector-control-command-value calculating unit configured to
calculate, from the torque command value, (i) a first magnetic-flux command value for which a loss of the AC motor is minimized, (ii) a terminal-voltage amplitude of the AC motor when the AC motor is controlled by the first magnetic-flux command value, and (iii) a second magnetic-flux command value when the AC motor is controlled in a one-pulse mode,
calculate a first total sum of losses of the AC motor and losses of the second main circuit when the AC motor is controlled by the first magnetic-flux command value and a second total sum of losses of the AC motor and losses of the second main circuit when the AC motor is controlled by the second magnetic-flux command value and output to the vector control unit a magnetic-flux command value corresponding to a total sum of smaller losses,
set a lower limit value that is previously decided by a characteristic of the first main circuit and that is related to an applied voltage of the DC-power source unit to a DC voltage command value to command the voltage of the DC-power source unit, and
output the DC-voltage command value to the vector control unit.

6. The electric vehicle controller according to claim 5, wherein characteristics of the first main circuit include a voltage condition of the AC power source and a circuit configuration of the first main circuit, and an insulating property and a withstand voltage property of the first main circuit.

7. An electric vehicle controller including an AC motor, the electric vehicle controller comprising:

a main circuit configured to convert a DC power supplied from a DC power source into an AC power and supply the AC power to the AC motor;

a vector control unit configured to generate a switching command to instruct a switching operation of the main circuit, thereby performing vector control of the AC motor;

a torque-command-value generating unit configured to generate a torque command value that is a command value of a torque that the AC motor is caused to output and a notch command value received from an operation unit operated by a driver of the electric vehicle; and a vector-control-command-value calculating unit including a table registered with a magnetic-flux command value corresponding to a total sum of smaller losses, previously calculated, according to the notch command value, based on (i) a first magnetic-flux command value for which a loss of the AC motor is minimized, (ii) a second magnetic-flux command value that is a magnetic-flux command value when the AC motor is controlled in a one-pulse mode, (iii) a first total sum of losses of the AC motor and losses of the main circuit when the AC motor is controlled by the first magnetic-flux command value, and (iii) a second total sum of losses of the AC motor and losses of the main circuit when the AC motor is controlled by the second magnetic-flux command value, wherein the vector-control-command-value calculating unit selects from the table, according to the notch command value, the magnetic-flux command value to be output to the vector control unit.

8. An electric vehicle controller including an AC motor, the electric vehicle controller comprising:

a first main circuit configured to convert an AC power supplied from an AC power source into a DC power;

a converter control unit configured to generate a switching command to instruct a switching operation of the first main circuit;

a DC-power source unit configured to receive the DC power from the first main circuit;

a DC-voltage detecting unit configured to detect a voltage of the DC-power source unit;

a second main circuit configured to convert a DC power output from the DC-power source unit into a converted AC power and supply the converted AC power to the AC motor;

a vector control unit configured to generate a switching command to instruct a switching operation of the second main circuit, thereby performing vector control of the AC motor;

a torque-command-value generating unit configured to generate a notch command value received from an operation unit of a driver of the electric vehicle and a torque command value that is a command value of a torque that the AC motor is caused to output; and a vector-control-command-value calculating unit including a table registered with a DC voltage command value that is used to command voltage of the DC-power source unit and that is previously calculated, according to the notch command value, based on (i) a terminal-voltage amplitude of the AC motor when being controlled by a magnetic-flux command value for which a loss of the AC motor is minimized and (ii) an upper limit value and a lower limit value that are previously decided by a characteristic of the first main circuit and that are related to an applied voltage of the DC-power source unit, wherein the vector-control-command-value calculating unit selects, according to the notch command value, the DC-voltage command value to be output to the converter control unit from the table.

9. The electric vehicle controller according to claim 8, wherein characteristics of the first main circuit include a voltage condition of the AC power source and a circuit configuration of the first main circuit, and an insulating property and a withstand voltage property of the first main circuit.

\* \* \* \* \*